United States Patent
Kallioinen et al.

(10) Patent No.: US 6,327,916 B1
(45) Date of Patent: Dec. 11, 2001

(54) APPARATUS AND METHOD FOR MEASURING THE FLOW CHARACTERISTICS OF A SLURRY

(75) Inventors: Jouko Kallioinen, Littleton; William F. Schwartz, Bailey, both of CO (US); Kenneth D. Engquist, Hamden, CT (US); Daniel P. Monchak, Berthoud; Alexander C. Probst, Bailey, both of CO (US)

(73) Assignee: GL&V/Dorr-Oliver Inc., Milford, CT (US)

( * ) Notice: Subject to any disclaimer, the term of this patent is extended or adjusted under 35 U.S.C. 154(b) by 0 days.

(21) Appl. No.: 09/458,396

(22) Filed: Dec. 10, 1999

(51) Int. Cl.[7] .................................................. G01F 1/30
(52) U.S. Cl. ....................................................... 73/861.73
(58) Field of Search ........................... 73/861.73, 861.72, 73/862.61, 861.74

(56) References Cited

U.S. PATENT DOCUMENTS

| | | |
|---|---|---|
| 2,059,549 | 11/1936 | Carlson . |
| 2,442,938 | 6/1948 | Ruge . |
| 2,760,040 | 8/1956 | Statham . |
| 2,858,400 | 10/1958 | Statham . |
| 2,889,527 | 6/1959 | Statham . |
| 3,232,486 | 2/1966 | Ofner . |
| 3,269,181 | 8/1966 | Seay . |
| 3,407,652 | 10/1968 | Schomburg et al. . |
| 3,433,064 | 3/1969 | Jacobson . |
| 3,548,650 | 12/1970 | Boadle . |
| 3,640,136 | * 2/1972 | Nolte ...................................... 73/228 |
| 4,543,835 | * 10/1985 | Volk, Jr. et al. .................. 73/861.73 |
| 4,644,803 | 2/1987 | Ward . |
| 4,836,028 | 6/1989 | Voituriez . |
| 5,752,545 | * 5/1998 | Vienneau et al. ..................... 137/486 |
| 5,798,466 | * 8/1998 | Satake et al. ..................... 73/861.73 |
| 5,895,865 | * 4/1999 | Ozawa ............................... 73/861.73 |

* cited by examiner

Primary Examiner—Benjamin R. Fuller
Assistant Examiner—Jewel V. Thompson
(74) Attorney, Agent, or Firm—McCormick, Paulding & Huber LLP

(57) ABSTRACT

In an apparatus for measuring the flow characteristics of a slurry discharged from a flotation cell, a metering flange includes a central axis and interior area defined by at least one flange wall. The metering flange is coupled to the flotation cell and includes an inlet coaxial with the axis and in fluid communication with the slurry discharge from the cell. An outlet is also coaxial with the inlet section for allowing the slurry to flow through the interior area. An impingement plate is positioned in the interior area such that an impingement surface defined by the plate is acted upon by slurry flowing through the metering flange. A load cell measures force exerted on the impingement plate by the slurry flowing through the interior area via a transfer mechanism coupled to the impingement plate and in communication with the load cell.

6 Claims, 3 Drawing Sheets

APPARATUS AND METHOD FOR MEASURING THE FLOW CHARACTERISTICS OF A SLURRY

FIELD OF THE INVENTION

The present invention is generally directed to the measurement of process parameters, and is more specifically directed to a device for measuring the flow rate of a slurry discharged from equipment such as flotation cells.

BACKGROUND OF THE INVENTION

Flotation cells are commonly employed to separate solid material from a slurry typically composed of liquids and solids in varying proportions. An impeller located in the flotation cell agitates the slurry dispersing entrapped gas, thereby causing the formation of gas bubbles. Particulate solid material adheres to the surface of the gas bubbles and rises there with to the slurry surface forming a froth that has a higher concentration of the floatable material, as compared to the starting slurry.

The froth, which is a combination of liquid, solid particles, and gas is removed from the flotation cell for further processing. In order to optimize the operation of the flotation cell, it is important to remove the froth at an appropriate rate. Where several flotation cells are operating at one time it is desirable to synchronize their operation, thereby simplifying the control of the individual cells.

A problem often encountered in flotation cell control is due to the non-homogeneous composition of the froth. It is difficult to accurately ascertain the rate at which the froth is being removed from the flotation cell. In the past, ultrasonic level sensors, and magnetic flow meters have been employed, however, the presence of the gaseous phase and the inability of these sensors to detect it has made the readings obtained from these instruments unreliable. Video cameras have also been utilized with little success in an effort to track the speed at which the froth moves toward a peripheral edge of the flotation cell.

Based on the foregoing, it is the general object of the present invention to provide a device for monitoring the rate of froth removal from a flotation cell, that overcomes the problems and drawbacks associated with prior art measurement instruments.

It is a more specific object of the present invention to provide such a device that is capable of measuring froth rate removal and is not affected by the presence of the gaseous phase.

SUMMARY OF THE PRESENT INVENTION

The present invention is directed to an apparatus for measuring the flow characteristics of a liquid/solid/gas slurry discharged from a flotation cell that includes, a metering flange coupled to the flotation cell. The metering flange includes at least one flange wall that defines an interior area having a central axis. An inlet section is provided and is coaxial with the central axis and in fluid communication with the slurry discharged from the flotation cell. An outlet coaxial with the inlet section allows the slurry to flow through the interior area of the metering flange. An impingement plate is positioned in the interior area and defines an impingement surface that is acted upon by the slurry flowing through the metering flange. A load cell measures the force exerted on the impingement plate by the slurry and therefrom via transfer means coupling the load cell and impingement plate together.

In the preferred embodiment of the present invention a support mechanism locates and maintains the position of the impingement plate relative to the inlet section in such a manner that the impingement surface extends approximately symmetrically about the central axis of the metering flange.

Preferably, the transfer means includes a flexible member coupled at a first end to the load cell, and at a second end to the impingement plate. The impingement plate being movable relative to the flange along the central axis such that the force exerted by the slurry against the impingement surface creates tension in the flexible member that in turn is measured by the load cell.

In an alternate embodiment of the present invention, the load cell is positioned to detect and measure compressive forces. To accomplish this, the load cell is secured to a mounting flange that in turn is attached to the metering flange adjacent to the outlet. The transfer means includes an actuating member extending from an underside of the impingement plate at one end and engaging the load cell at an appropriate end. During operation, the force exerted on the impingement surface by the slurry is transferred through the actuating member to the load cell, and from the load cell to a controller that determines the mass flow rate of the slurry. A bellows encompasses and seals the load cell from ingress of the slurry thereby preventing the load cell from being damaged.

In addition to mass flow rate measurements, the present invention can also be used to measure volumetric flow. Since the inlet section defines a known orifice diameter, a level sensor is positioned above the inlet section and the corresponding fluid level above the orifice can be measured. Volumetric flow can then be determined following well-developed flow equations.

DETAILED DESCRIPTION OF THE PREFERRED EMBODIMENT

Figure 1:
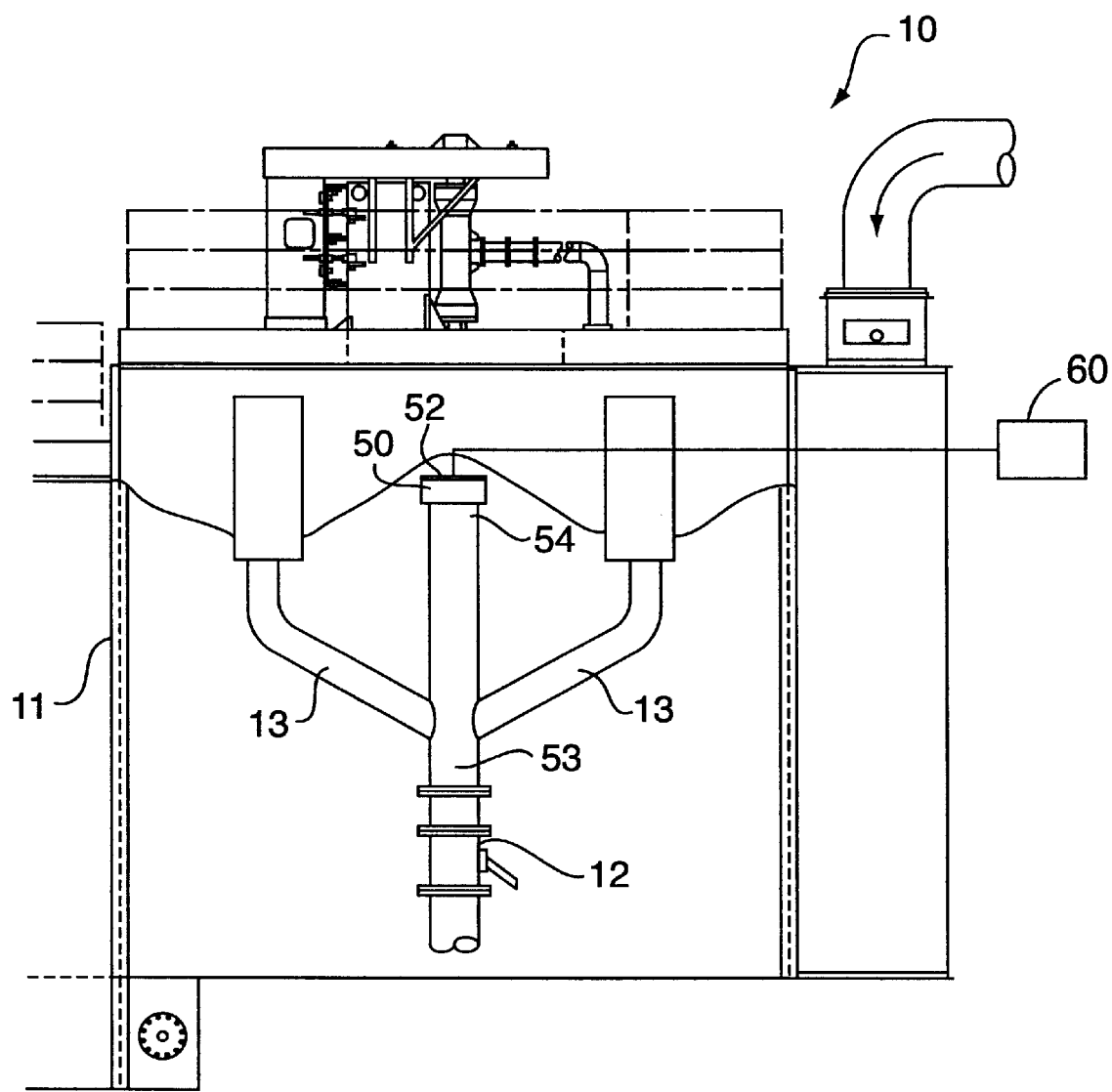
FIG. 1. is a side elevational view showing the apparatus of the present invention, mounted to a flotation cell.

As shown in FIG. 1, a flotation cell generally designated by the reference number 10 includes a tank, having a mass flow measuring apparatus 12, positioned therein. During operation, a slurry of liquid and particulate is pumped into the tank 11. The slurry is agitated in the tank 11 and gas is injected into the tank, forming bubbles. The particulate material adheres to the surface of the bubbles and floats to the top of the flotation cell 10 forming a froth on the slurry surface. The froth, having the particulate thereon is then drawn from the tank and flows through conduit 13.

Figure 2:
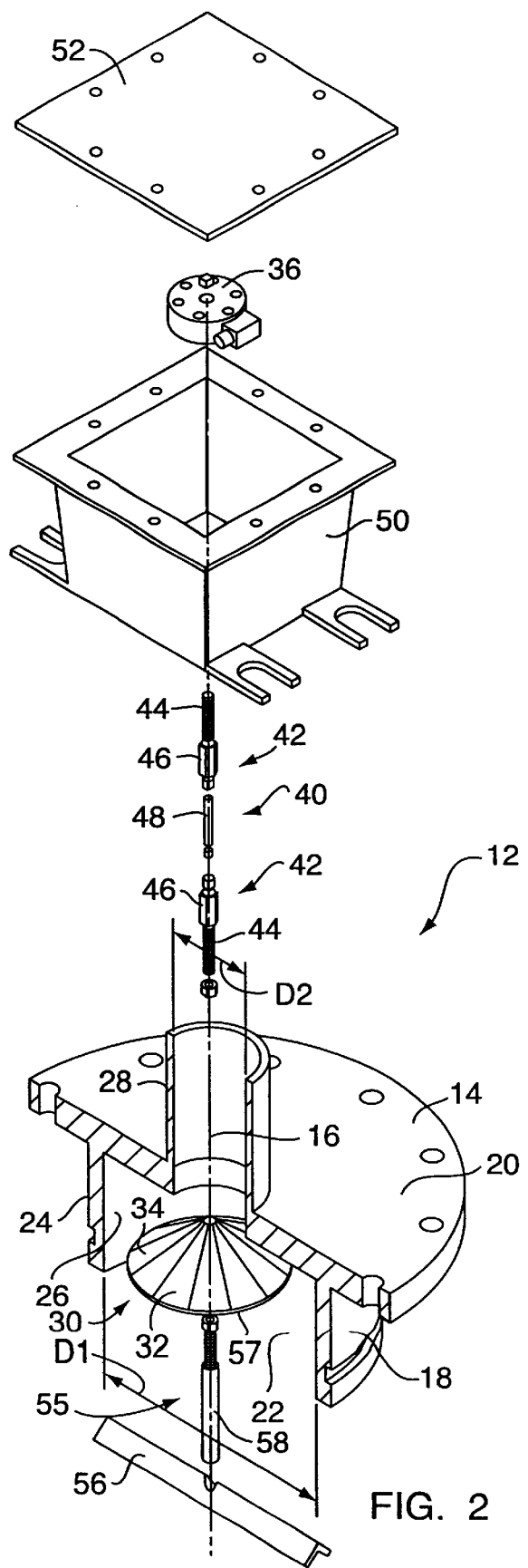
FIG. 2 is an exploded view of the apparatus for measuring the mass flow rate of a slurry discharged from a flotation cell of FIG. 1.

Turning to FIG. 2, the mass flow measuring apparatus 12 includes a metering flange 14 symmetric about a central axis 16 and having a side wall 18 and an upper wall 20 coacting to define an interior area 22. The metering flange also includes an inlet section 24 having a bore 26 coaxial with the central axis 16 and defining a diameter D1 extending therethrough. The metering flange 14 also includes an orifice section 28 coaxial with the inlet section 24 and defining an orifice diameter D2.

An impingement plate 30 is positioned in the interior area 22 and in the illustrated embodiment, is generally symmetric about the central axis 16. The impingement plate 30 has a circular outer periphery 32 and a conical impingement surface 34 facing the orifice section 24. However, the present invention is not limited in this regard as the impingement plate 30 can assume any suitable shape, such as square, or rectangular without departing from the broader aspects of the present invention.

Still referring to FIG. 2, a load cell 36 is positioned above the orifice section 24 coaxial with the central axis 16. The load cell 36 is coupled to the support mechanism via a linkage generally designated by the reference number 40. A load cell found to be particularly suitable for use with the present invention is offered by Omega Corporation and is designated as Omega Load Cell No. LCH-100. The linkage 40 includes a pair of stud end fittings 42 of the type offered by McMaster Carr Corporation under part number 3475T54 6X19 IWRC. Each stud end fitting 42 includes an externally threaded first end 44, one of which is threadably engaged with the load cell and the other of which is threadably engaged with the impingement plate 30. Each stud end fitting 42 also includes a second end 46 adapted to receive and retain an end of a wire rope 48.

As shown in FIG. 2, a housing 50 is positioned over the load cell 36 and a cover 52 is fastened to the housing. Referring to FIG. 1, the metering flange is mounted in a conduit 53 with the housing 50 carrying the load cell 36 mounted to the top 54 of the conduit forming part of the flotation cell. Referring back to FIG. 2, a support mechanism generally designated by the reference number 55 is employed to maintain the alignment of the impingement plate 30 relative to the inlet section 24. The support mechanism 55 includes a retaining member 56 coupled to an underside 57 of the impingement plate via a centering rod 58 threadably engaged with both the impingement plate and the retaining member.

During operation, the slurry flowing into the metering housing, which is different from the slurry in the tank in that it includes liquids, solids, and gas, causes a force to be exerted against the impingement surface 34 of the impingement plate 30, which in turn creates tension in the linkage 40. The tension is detected and read by the load cell which communicates with a controller 60 to provide an indication of the mass flow rate of the slurry being removed from the flotation cell. The slurry flowing past the impingement plate 30 consists of a combination of liquids, gas and solid particulate.

Figure 3:
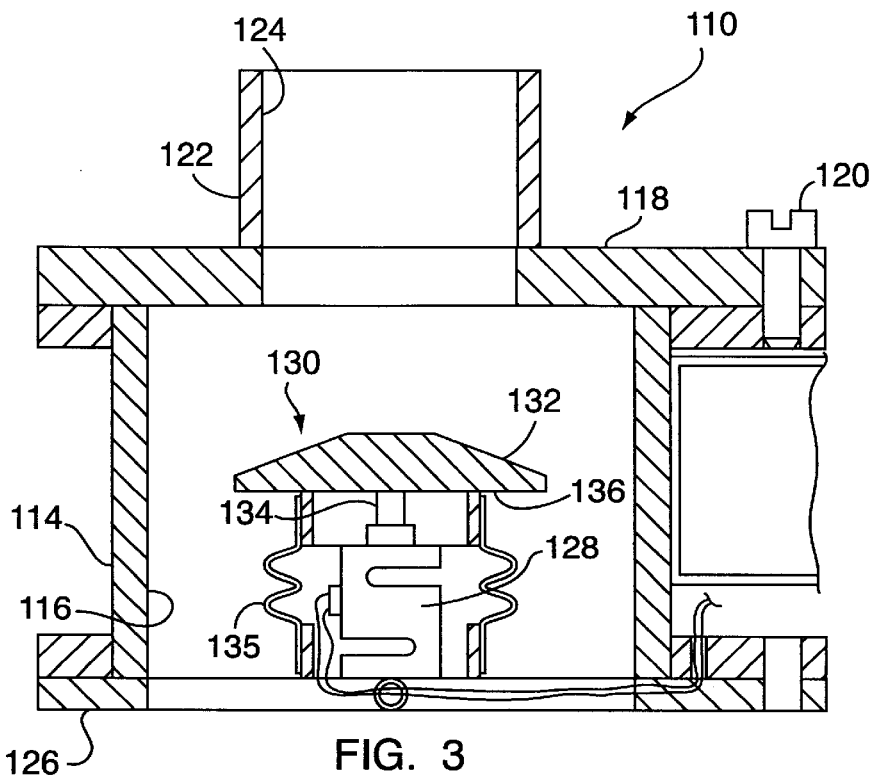
FIG. 3 is a side elevational view of an alternate embodiment of the apparatus of FIG. 1.

While the present invention has been shown and described as having the load cell configured to measure a tensile force, it is not limited in this regard. As shown in FIG. 3, the measuring apparatus 110 can be configured to measure a compressive load. The measuring apparatus 110 differs from the apparatus 10 in that, inter alia, the metering housing 114 defines a first bore 116 extending therethrough. An inlet flange 118 is attached to the metering flange 114 via fasteners 120 (only one shown), and defines an inlet section 122 having a second bore 124 extending therethrough and coaxial with the first bore 116. A mounting flange 126 is also attached to the metering flange opposite to the inlet flange 122 and is adapted to support the load cell 128 within the first bore 116. An impingement plate 130 defining an impingement surface 132 is also positioned in, and coaxial with the first bore 116. The impingement plate 130 is located above the load cell 128 with an actuating member 134 extending from an underside 136 of the impingement plate. The actuating member 134, engages the load cell 128 such that during operation, the force exerted on the impingement surface 132 by the slurry flowing through the metering housing causes a compressive force to be transmitted through the actuating member 134 to the load cell 128. A shroud 135, made from a suitable material, such as, but not limited to rubber is attached to the impingement plate and extends over the load cell 128, thereby protecting the load cell from the ingress of slurry.

Figure 4:
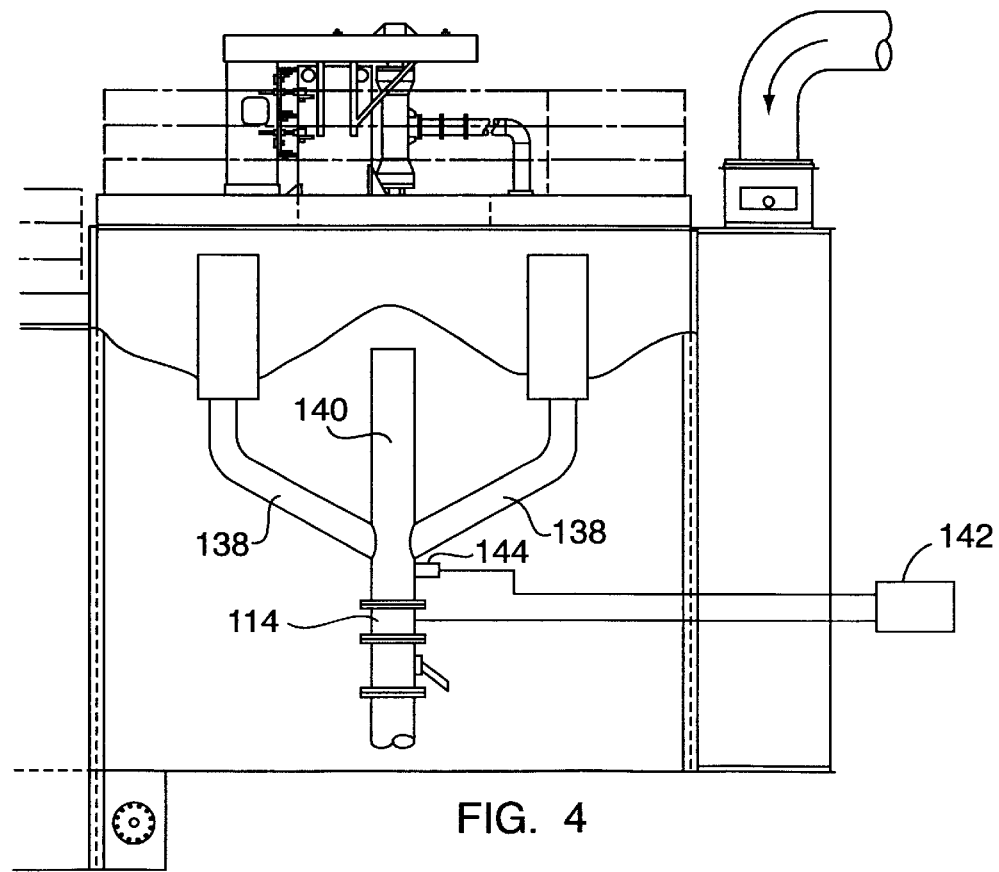
FIG. 4 is a side elevational view of the apparatus of FIG. 3 mounted to a flotation cell and including a level sensor to determine a volumetric flow rate.

As shown in FIG. 4, during operation the slurry, which consists of liquid, and solid particulate suspended on air bubbles, flows through conduits 138 and into conduit 140. The slurry then flows through the metering housing 114 where it contacts the impingement surface 132, FIG. 3 generating a compressive force thereon. The impingement plate 130 exerts this force against the actuating member 134 which in turn transmits the force to the load cell 128. The magnitude of the compressive force is transmitted via signals generated by the load cell to the controller 142 which determines the mass flow rate of the slurry. The flotation cell of FIG. 4, can also employ a level sensor 144 positioned in the conduit 140, and in electronic communication with the controller 142, to measure the height of the slurry above the inlet section 122, this information along with the diameter of the second bore in the inlet section will provide sufficient data to allow for the determination of a volumetric flow rate of the slurry.

While preferred embodiments have been shown and described, various modifications and substitutions may be made without departing from the spirit and scope of the invention. Accordingly, it is to be understood that the present invention has been described by way of example and not by limitation.

What is claimed is:

1. An apparatus for measuring the flow characteristics of a slurry discharged from a flotation cell, comprising:

a metering flange having a central axis and an interior area defined by at least one flange wall, said metering flange being coupled to the flotation cell and having an inlet section coaxial with said axis and in fluid communication with the slurry discharged from the flotation cell, and an outlet coaxial with said inlet section for allowing the slurry to flow through said interior area;

an impingement plate positioned in said interior area such that an impingement surface defined by said impingement plate is acted upon directly by the slurry flowing through said metering flange;

a load cell connected to the impingement plate for measuring a force exerted on said impingement surface by said slurry; and transfer means for coupling said load cell to said impingement plate such that the force exerted thereon is detected and measured by said load cell.

2. An apparatus as defined by claim 1, further comprising:

a support mechanism coupled to said flange and said impingement plate for locating said impingement surface relative to said inlet section such that said surface extends approximately symmetrically about said central axis.

3. An apparatus as defined by claim 1, wherein:

said load cell is positioned upstream of said inlet section; and said transfer means includes a flexible member coupled at a first end to said load cell, and at a second end to said impingement plate, said impingement plate being movable relative to said flange along said central axis such that the force exerted by said slurry against said impingement surface creates tension in said flexible member that in turn is measured by said load cell.

4. An apparatus as defined by claim 1, further comprising:

a mounting flange attached to said metering flange adjacent to said outlet;

said load cell being coupled to said mounting flange and extending into said interior area;

said transfer means including an actuating member extending from an underside of said impingement plate, said actuating member being engaged with said load cell; and whereby during operation the force exerted on said impingement surface by said slurry is transferred through said actuating member to said load cell.

5. An apparatus as defined by claim 4, further comprising:

a shroud extending between said mounting flange and said impingement member and surrounding said load cell, thereby sealing said load cell against the ingress of said slurry.

6. An apparatus as defined by claim 1, wherein:

said metering flange includes an orifice plate having an aperture extending therethrough and defining a first diameter, positioned between said interior area and said inlet section;

said inlet section being coaxial with said central axis and extending outwardly from said orifice plate, said inlet section having a bore extending therethrough and defining a second diameter;

a sensor positioned in said inlet section bore for detecting, during operation, a level of said slurry in said inlet section above said orifice plate.

* * * * *